INVENTOR:
DOUGLAS M. GLUNTZ

Feb. 10, 1970  D. M. GLUNTZ  3,494,296
DIFFUSER
Filed June 14, 1968  3 Sheets-Sheet 3

United States Patent Office 3,494,296
Patented Feb. 10, 1970

3,494,296
DIFFUSER
Douglas M. Gluntz, Campbell, Calif., assignor to General Electric Company, a corporation of New York
Filed June 14, 1968, Ser. No. 737,066
Int. Cl. F04f 5/00, 5/44
U.S. Cl. 103—258                26 Claims

ABSTRACT OF THE DISCLOSURE

An improved diffuser for converting fluid momentum into static pressure. Typically, a generally conical diffuser is provided with one or more spaced intermediate approximately cylindrical recovery sections. This multistage diffuser is capable of improved momentum conversion efficiency.

BACKGROUND OF THE INVENTION

Diffusers have long been used to convert fluid momentum into static pressure in many types of fluid handling machinery. Basically, a diffuser is a flow passage which gradually expands in cross-section along its length from a fluid entrance at one end to a fluid exit at the other. As a fluid passes through the diffuser, velocity decreases and as a result of momentum transformation or conversion, static pressure increases. Efficient momentum conversion is necessary in many devices, such as jet pumps, gas turbines, etc.; where certain basic processes have been conducted under relatively high velocity fluid flow conditions but which desirably eventually terminate in low velocity flow conditions to maximize exhaust pressure level. Effective conversion rests on the ability to obtain uniform deceleration of the flowing stream across the entire flow passage cross section. However, fluid energy losses occur during this conversion process, limiting diffuser conversion efficiency.

Many diffuser designs have been proposed to limit fluid energy losses and obtain high efficiency. Generally, a well designed diffuser, having a generally conical straight-walled configuration and a relatively low diffuser expansion angle may be capable of converting about 80% of its entrance kinetic energy into sensible static pressure. Many variations on this configuration have been proposed. Some diffusers are two-dimensional in that the elongated passage only expands in one plane. Other diffusers have been designed with axially curved walls and with internally-mounted splitter vanes, vortex generators, etc. In general, however, these design variations have not produced significant increases (e.g. one percent or greater) in diffuser efficiency.

Uniform deceleration of the flowing fluid and maximum conversion of the momentum of the fluid into static pressure cannot be achieved when there are significant variations in velocity across the flowing stream. This problem is aggravated where there is a relatively slow-moving or stagnant boundary layer on the inner surface of the diffuser. Sometimes this condition becomes so severe that flow separation of the streamlines occurs, i.e., at some point in the diffuser the streamlines break away from the diverging wall of the diffuser as a result of the formation of a group of relatively large-sized eddies which are intermittent or permanent and which displace the normal smoothly-diverging streamlines into parallel flow, resulting in undesirable losses in system efficiency. As a result of the essentially stagnant boundary layer of fluid, the central core of fluid-flow in the diffuser fails to decelerate to the extent expected from the physical geometry of the diffuser. Thus, the boundary layer causes the diffuser to fail to recover significant portions of the momentum presented at the diffuser entrance.

In high flow capacity, high efficiency fluid flow systems, large financial savings can be achieved through relatively small improvements in diffuser performance. Thus, there is a continuing need for diffusers of higher energy conversion efficiency.

It is, therefore, an object of this invention to provide a diffuser of higher energy conversion efficiency.

Another object of this invention is to provide a diffuser having minimum fluid energy losses.

The above objects, and others, are accomplished in accordance with this invention by providing a multi-stage diffuser having between the diffuser entrance and exit at least one recovery section having an expansion angle substantially less than that of the sections adjacent the entrance and exit. Where two or more recovery sections are used, the sections between the recovery sections will have an expansion angle substantially greater than that of the recovery sections. Generally, these intermediate expansion sections will have substantially the same expansion angle as the sections adjacent the diffuser entrance and exit.

While the diffuser may have any desired cross-section, such as rectangular or elliptical, best results are obtained where the cross-section is substantially circular, the diffusing sections are substantially conical and the recovery sections are substantially cylindrical.

The improved diffuser of this invention is especially useful with the jet pump assembly described in the co-pending application entitled "Jet Pump," Ser. No. 739,090 filed concurrently herewith.

Diffuser performance is improved with from 1 to about 6 recovery sections in the diffuser body. In general, greatest improvement in energy conversion efficiency is obtained with from 1 to about 4 recovery sections. Best results are usually obtained with 3 recovery sections.

While any suitable recovery section length may be used where desired, optimum length for each recovery section has generally been found to be about equal to its entrance diameter multiplied by its position number from the diffuser entrance. Thus, the first recovery section would have a length about equal to its diameter, the second would have a length about equal to twice its diameter, etc.

Any suitable amount of expansion (as indicated by the ratio of expansion section exit area to entrance area) may be used in each expansion section. Preferably, for highest momentum conversion efficiency, the ratio of exit area to entrance area of any one expansion stage about equals the ratio of the diffuser exit area to diffuser entrance area, multiplied by the square root of the quantity (one plus the number of recovery stages). This relationship may be expressed by the equation $$R_S = R_D \sqrt{1+N}$$

where $R_S$ is the area ratio of the individual expansion section exit to expansion section entrance; $R_D$ is the area ratio of the diffuser exit to diffuser entrance and $N$ is the number of recovery stages.

Any suitable area ratio of diffuser exit to diffuser entrance may be used. Advantageous results are obtained over the range of about 1.5:1 to about 8:1. It is preferred, however, that this ratio range from about 3.5:1 to about 6:1. A much lower ratio results in lower momentum conversion efficiency due to high exhaust velocity, while a much higher ratio tends to increase equipment size and cost. An optimum balance has been obtained where this ratio is about 6:1.

The overall diffuser may have any suitable expansion angle. This angle is that between the centerline of the diffuser and a line drawn between the diffuser wall at the entrance to the diffuser and the wall at the diffuser exit. Advantageous results are obtained over a range of from about 1° to about 7°. It is preferred, however, that this angle range from about 2° to about 5°. A much smaller angle tends to increase wall friction energy losses and to require that the diffuser be overly long to give the desired exit-entrance area ratio. A much greater angle will increase energy losses due to increasing tendency for flow separation and turbulence. Optimum results have been obtained with a diffuser expansion angle of about 2.2°.

DETAILED DESCRIPTION OF THE DRAWING

Figure 1:
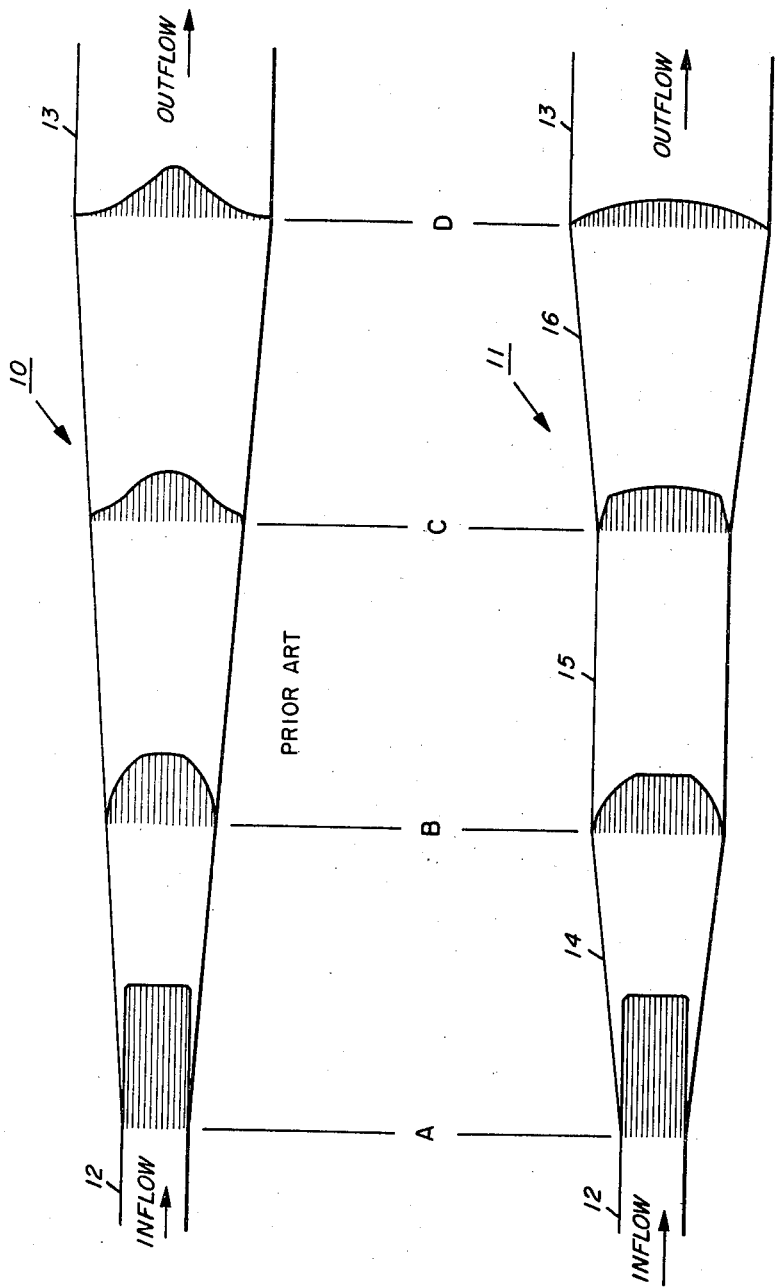
FIGURE 1 shows in schematic juxtaposition velocity profiles along a diffuser of the prior art and a diffuser according to the present invention.

Referring now to FIGURE 1, there is seen schematic representations of a pair of diffusers. The upper diffuser, generally designated 10 is a conical diffuser according to the prior art, while the lower diffuser generally designated 11 is a multi-stage diffuser according to the present invention. Each of these diffusers has the same ratio of diffuser exit area to entrance area, the same diffuser expansion angle and the same overall length. Each diffuser has a cylindrical inlet section 12, which may be, for example, a wind tunnel exhaust or the mixing section of a jet pump, and a cylindrical outlet section 13 which may be a tailpipe, conduit, etc.

Fluid is flowed through each diffuser at the same initial velocity and pressure. Velocity is measured at a plurality of points along lines perpendicular to the diffuser centerlines at A, B, C and D. The velocity gradient across the diffuser diameter at each of these points is then plotted. It should be remembered that the velocity is measured only at the indicated stations and that the displacement of the curves to the right is only an indication of relative velocity.

As discussed above, near uniform velocity across a diffuser cross-section will result in higher momentum conversion efficiency than will be the case where higher peak velocity-to-average velocity conditions characterize the flow.

At the diffuser entrance (Station A) the high velocity fluid stream entering the diffuser has a highly uniform velocity profile (i.e., a very low peak-to-average velocity ratio) with only a very thin boundary layer. Overall velocity is high, as indicated by the displacement of the curve to the right of the indicated measurement station.

At Station B, the stream has begun to diminish in velocity and increase in pressure. The velocity decrease is indicated by lower maximum displacement of the velocity profile curve. In prior art diffuser 10, velocity is lower near the diffuser wall than at the center, showing that a low velocity boundary layer has begun to form. In the new diffuser 11, Point B is at the end of the first expansion section 15. Since the expansion angle of section 14 is necessarily greater than the over-all expansion angle of diffuser 10, there has been a greater momentum conversion. But the profile for diffuser 11 shows even greater peak-to-average velocity variations across the diffuser than does the profile at Station B for diffuser 10.

At Station C, diffuser 10 shows increasingly severe velocity variations across the cross-section. The velocity at the center is much greater than over the large flow passage area adjacent the walls. In diffuser 11, Station C is at the end of recovery section 15. As can be seen, the peak-to-average velocity ratio has been greatly reduced by recovery section 15. Velocity is substantially uniform, with only a thin boundary layer of lower velocity flow adjacent the diffuser walls.

At the diffuser exits, at Station D, the difference in velocity profiles and in peak-to-average velocity level ratios is clear between prior art diffuser 10 and the improved diffuser 11. Velocity varies widely across the diffuser 10, with very low velocity over a large passage area adjacent the diffuser wall. Velocity at the center has decreased only slightly between Stations C and D in diffuser 10. Diffuser 11, however, still shows a more nearly uniform velocity gradient at Station D. Velocity is low even at the center, indicating superior conversion of momentum (fluid kinetic energy) into static pressure.

Figure 2:
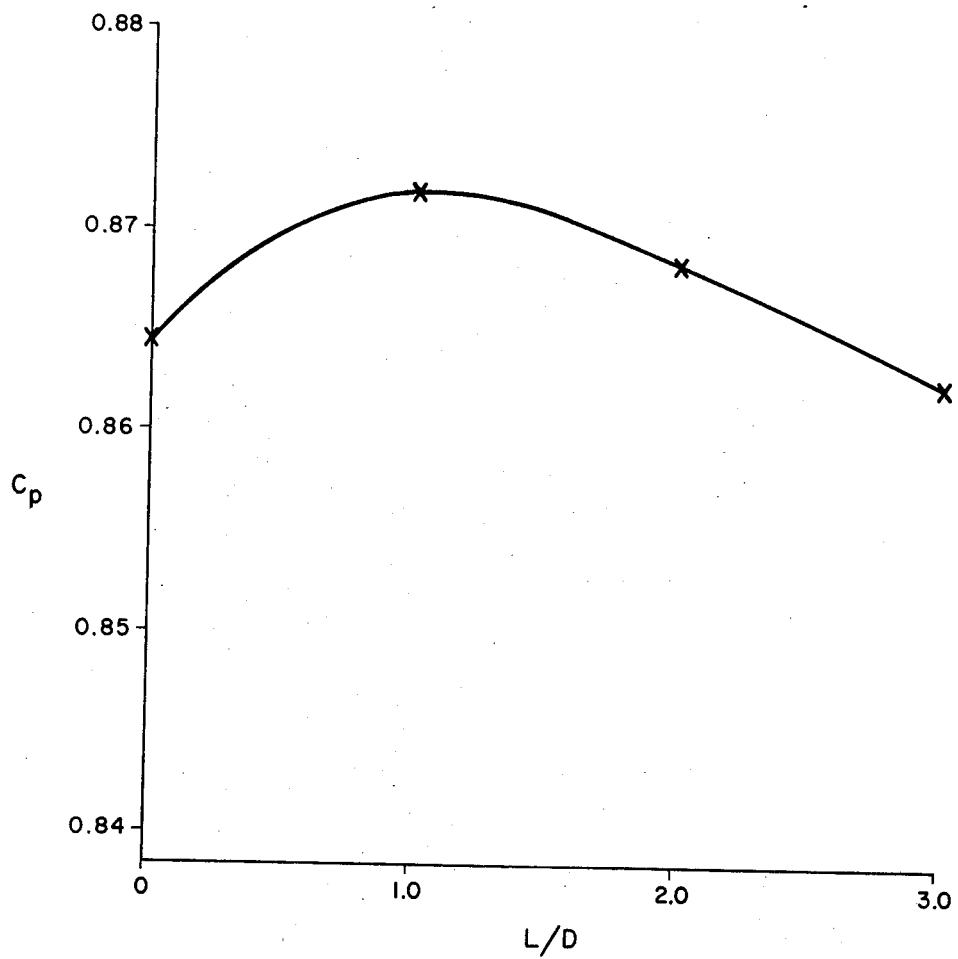
FIGURE 2 illustrates in graph form the improved diffuser efficiency with a multi-stage diffuser.

FIGURE 2 illustrates in graphical form the improved diffuser performance resulting from the inclusion of recovery stages. FIGURE 2 shows a plot of $C_p$ versus $L/D$ for the single recovery section where $C_p$ is a measure of a diffuser's ability to convert relatively high momentum at the diffuser inlet to pressure energy at the diffuser outlet and $L/D$ is the ratio of recovery section length to diameter. Specifically $C_p$ is obtained from the following equation:

$$C_p = \frac{\Delta P}{\left(\frac{\rho \overline{V_1}^2}{2g}\right)}$$

where P is the change in static pressure from the diffuser inlet to the diffuser outlet; $\rho$ is the density of the fluid, $\overline{V}$ is the average inlet bulk velocity and $g$ is a constant of the proportionality between force and momentum.

The values for $C_p$ given in FIGURE 2 were obtained by testing diffusers having recovery sections of different lengths in a closed loop pipe system. Water was pumped upwardly through the test diffuser at varying rates while pressure and velocity were measured. It was found that aside from very small changes in performance due to Reynolds number effects, a given diffuser exhibited virtually constant performance (i.e., a constant value for $C_p$) over a wide range of flow rates.

For the purposes of this test, a diffuser having a length of about 27 inches and a ratio of exit area to entrance area of about 6:1 was used. This diffuser is separable at a point about 9 inches from the entrance enabling insertion of a recovery section.

As seen in FIGURE 2, a diffuser with no recovery section ($L/D=0$) gave $C_p$ of about 0.864. As recovery sections of increasing length are introduced between two adjacent expansion sections, $C_p$ increases to about 0.872 at $L/D=1$, then begins to fall off. Thus, for the test diffuser, a single recovery section having an $L/D$ of about 1 is optimum. Further increases in $C_p$ may be obtained by adding additional spaced recovery stages, as discussed above. For example, with a first stage with an $L/D$ ratio of about 1 and a second recovery stage with an $L/D$ ratio of about 2, $C_p$ has been found to improve to about 0.877.

Optimum recovery section length, expansion section area ratios, etc., may vary slightly within the ranges given above, depending on specific combinations of the variables noted above. Therefore, for optimum over-all results, a given diffuser design should be tested to determine the exact optimum dimensions, etc., within these ranges.

Figure 3:
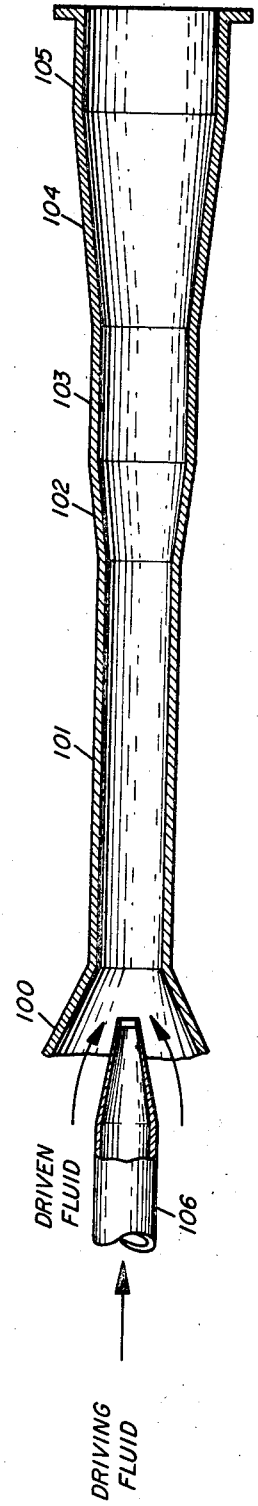
FIGURE 3 shows a section through a schematically illustrated jet pump incorporating the improved diffuser of this invention.

FIGURE 3 shows a simple schematic representation of a jet pump incorporating the diffuser of this invention.

The jet pump body consists of a converging inlet section 100; a mixing section 101 of substantially uniform cross section; a diffuser made up of a first expanding section 102, a recovery section 103, and a second expanding section 104; and a tailpipe 105. Driving fluid enters through nozzle 106 at high velocity, while the driver fluid enters through inlet section 100 surrounding nozzle 106. As pointed out above, the diffuser may include several recovery sections, although only one is shown in FIGURE 3 for clarity.

This diffuser has been found to increase jet pump efficiency significantly over the same jet pump using a conventional uniformly expanding diffuser. Also, this diffuser concept may be incorporated into other jet pump systems and other systems, such as wind tunnels or gas turbine exhaust systems, where it is desired to convert momentum in a high velocity stream into pressure energy.

Although specific dimensions and components have been described in conjunction with the data illustrated in FIGURE 2, other suitable arrangements, dimensions, etc., as indicated above may be used with similar results.

Other modifications and ramifications of the present invention will occur to those skilled in the art upon reading the present disclosure. These are intended to be included within the scope of this invention.

I claim:

1. A diffuser for conversion of fluid momentum to static pressure in a fluid flow system comprising an elongated hollow body having a fluid entrance at one end and a fluid exit at the opposite end; the exit area being greater than the entrance area; a first approximately conical expansion section at said entrance; a second approximately conical expansion section at said exit, each expansion section expanding toward said exit; three substantially cylindrical spaced recovery sections between said first and second expanding sections; and an additional expansion section located between each succeeding pair of recovery sections, all of said expansion sections having about the same expansion angle.

2. The diffuser of claim 1 wherein each recovery section is substantially cylindrical and has a length about equal to the diameter of the recovery section multiplied by its position number from the diffuser entrance.

3. The diffuser of claim 1 wherein the ratio of exit area to entrance area of each expansion section is about equal to the ratio of the diffuser exit area to the diffuser entrance area multiplied by the square root of the quantity (1 plus the number of recovery sections).

4. The diffuser of claim 1 wherein the ratio of diffuser exit area to diffuser entrance area is from about 1.5:1 to about 8:1.

5. The diffuser of claim 1 wherein the ratio of diffuser tity (1 plus the number of recovery sections).

6. The diffuser of claim 1 wherein the diffuser expansion angle is from about 1 degree to about 7 degrees.

7. The diffuser of claim 1 wherein the diffuser expansion angle is about 2.2 degrees.

8. A diffuser for conversion of fluid momentum to static pressure in a fluid flow system comprising an elongated hollow body having a fluid entrance at one end and a fluid exit at the other end; said exit having an area substantially greater than the area of said entrance; first and second approximately conical expanding sections at said entrance and said exit, respectively, each expanding toward said exit; between said first and second expanding sections at least two spaced recovery sections; and an additional expanding section between each succeeding pair of recovery sections, each recovery section having an expansion angle substantially less than the expansion angle of said expanding sections.

9. The diffuser of claim 8 wherein each recovery section is substantially cylindrical and has a length about equal to the diameter of the recovery section multiplied by its position number from the diffuser entrance.

10. The dffuser of claim 8 wherein the ratio of exit area to entrance area of each expansion section is about equal to the ratio of the diffuser exit area to the diffuser entrance area multiplied by the square root of the quantity (1 plus the number of recovery sections).

11. The diffuser of claim 8 wherein the ratio of diffuser exit area to diffuser entrance area is from about 1.5:1 to about 8:1.

12. The diffuser of claim 8 wherein the ratio of diffuser ---it area to diffuser entrance area is about 6:1.

13. The diffuser of claim 8 wherein the diffuser expansion angle is from about 1 degree to about 7 degrees.

14. The diffuser of claim 8 wherein the diffuser expansion angle is about 2.2 degrees.

15. In a jet pump, the combination of: an inlet section for receiving a driven fluid; a nozzle adjacent said inlet section for receiving a driving fluid; a first approximately cylindrical section extending from said inlet section; a first approximately conical expanding section extending from said first cylindrical section; a second approximately cylindrical section extending from said first expanding section; and a second approximately conical expanding section extending from said second cylindrical section.

16. The combination of claim 15 further including a third approximately cylindrical section extending from said second expanding section.

17. The combination of claim 15 wherein said second cylindrical section has a length about equal to its diameter.

18. The combination of claim 16 wherein said second cylindrical section has a length about equal to its diameter and said third cylindrical section has a length about equal to twice its diameter.

19. The combination of claim 15 wherein the ratio of the entrance area of said first expanding section to the exit area of said second expanding section is about 6:1.

20. The combination of claim 15 wherein the expansion angle of said first and second expanding sections is about 2.2 degrees.

21. In a device for mixing fluid streams of unequal velocity and for converting a portion of the momentum of the mixture to pressure, the combination of: an elongated mixer section of substantially uniform cross section for receiving said fluid streams; a first diverging section having expanding cross section area extending from said mixer section; a first recovery section extending from said first diverging section, said first recovery section having a length less than the length of said mixer section; and a second diverging section having an expanding cross section area extending from said first recovery section, said first recovery section expanding in cross section area substantially less than said first and second diverging sections.

22. The combination of claim 21 further including a second recovery section extending from said second diverging section, said second recovery section expanding in cross section area substantially less than said first and second diverging sections, said second recovery section having a length greater than said first recovery section.

23. The combination of claim 21 wherein said recovery section is substantially cylindrical and has a length about equal to its diameter.

24. The combination of claim 22 wherein said recovery sections are substantially cylindrical and wherein each recovery section has a length about equal to the diameter of the recovery section multiplied by its position from said mixer section.

25. The combination of claim 21 wherein the ratio of the exit area of said second diverging section to the entrance area of said first diverging section is about 6:1.

26. The combination of claim 21 wherein said diverging sections are substantially conical and wherein the expansion angle of said diverging sections is about 2.2 degrees.

References Cited
UNITED STATES PATENTS

| | | | |
|---|---|---|---|
| 720,908 | 2/1903 | Eynon | 230—92 |
| 862,005 | 7/1907 | McDermott | 230—92 |
| 1,748,488 | 2/1930 | McCabe | 230—92 |
| 1,942,048 | 1/1934 | Clark | 230—95 |
| 2,011,224 | 8/1935 | Kobiolke et al. | 230—92 |
| 2,988,139 | 6/1961 | Coanda | 230—95 |
| 3,187,682 | 6/1965 | Bradshaw | 230—95 X |
| 3,371,618 | 3/1968 | Chambers | 230—95 X |

DONLEY J. STOCKING, Primary Examiner

W. J. KRAUSS, Assistant Examiner

U.S. Cl. X.R.

103—277; 230—92

UNITED STATES PATENT OFFICE
CERTIFICATE OF CORRECTION

Patent No. __3,494,296__  Dated __10 February 1970__

Inventor(s) __Douglas M. Gluntz__

It is certified that error appears in the above-identified patent and that said Letters Patent are hereby corrected as shown below:

Column 2, line 28, "Ser. No. 739,090" should read --Ser. No. 737,090--. Column 4, line 11, insert a comma after "section"; and line 65, "driver" should be --driven--. Column 5, line 36, "tity (1 plus the number of recovery sections)." should be --exit area to diffuser entrance area is about 6:1.--; and line 68, the word before "area" (first occurrence) is "exit".

SIGNED AND SEALED

JUL 21 1970

(SEAL)
Attest:

Edward M. Fletcher, Jr.
Attesting Officer

WILLIAM E. SCHUYLER, JR.
Commissioner of Patents